(12) United States Patent
Howland et al.

(10) Patent No.: US 10,581,994 B2
(45) Date of Patent: Mar. 3, 2020

(54) FACILITATING COMMUNICATION BETWEEN AN ORIGIN MACHINE AND A TARGET MACHINE

(71) Applicant: International Business Machines Corporation, Armonk, NY (US)

(72) Inventors: Michael J. Howland, Endicott, NY (US); Kurt N. Schroeder, Endicott, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/033,567

(22) Filed: Jul. 12, 2018

(65) Prior Publication Data

US 2018/0324267 A1 Nov. 8, 2018

Related U.S. Application Data

(63) Continuation of application No. 14/921,366, filed on Oct. 23, 2015, now Pat. No. 10,069,927, which is a continuation of application No. 14/856,804, filed on Sep. 17, 2015, now Pat. No. 9,923,985.

(51) Int. Cl.
*H04L 29/08* (2006.01)
*H04L 12/24* (2006.01)
*G06F 9/54* (2006.01)

(52) U.S. Cl.
CPC .......... *H04L 67/2804* (2013.01); *G06F 9/548* (2013.01); *H04L 41/0803* (2013.01); *H04L 41/5019* (2013.01)

(58) Field of Classification Search
CPC ............. H04L 67/2804; H04L 41/0803; H04L 41/5019
See application file for complete search history.

(56) References Cited

U.S. PATENT DOCUMENTS

| 5,487,167 | A | | 1/1996 | Dinallo et al. |
| 5,911,066 | A | * | 6/1999 | Williams ................ G06F 9/543 717/162 |
| 6,000,028 | A | * | 12/1999 | Chernoff ............. G06F 9/45504 712/226 |
| 6,226,789 | B1 | * | 5/2001 | Tye .......................... G06F 8/52 717/138 |
| 6,282,581 | B1 | * | 8/2001 | Moore .................... G06F 9/548 719/316 |

(Continued)

OTHER PUBLICATIONS

List of IBM Patents or Patent Applications Treated as Related; (Appendix P), Filed Jul. 12, 2018; 2 pages.

(Continued)

*Primary Examiner* — Mohamed A. Wasel
(74) *Attorney, Agent, or Firm* — Cantor Colburn LLP; Edward Wixted

(57) ABSTRACT

A method, computer program product, and/or system for facilitating communication between an origin machine and a target machine are provided. To facilitate communication, a reference to an original object of the origin machine is constructed within a remote object services level. Then reference is passed within the remote object services level from the origin machine to the target machine. The passing of the reference, in turn, causes a creation of a proxy and an invocation of a target method on the target machine.

15 Claims, 7 Drawing Sheets

Process Flow 300

(56) References Cited

U.S. PATENT DOCUMENTS

| | | | |
|---|---|---|---|
| 7,353,521 B1* | 4/2008 | Jin | G06F 9/465 |
| | | | 719/316 |
| 7,562,369 B1* | 7/2009 | Salamone | G06F 9/54 |
| | | | 719/328 |
| 8,009,672 B2 | 8/2011 | Brown et al. | |
| 8,312,150 B2 | 11/2012 | Clark et al. | |
| 9,923,985 B2 | 3/2018 | Howland et al. | |
| 2002/0016866 A1* | 2/2002 | Menges | G06F 9/465 |
| | | | 719/315 |
| 2002/0032718 A1* | 3/2002 | Yates | G06F 9/4486 |
| | | | 718/107 |
| 2003/0018765 A1* | 1/2003 | Muhlestein | H04L 41/0233 |
| | | | 709/223 |
| 2003/0145094 A1* | 7/2003 | Staamann | G06F 9/465 |
| | | | 709/229 |
| 2011/0010461 A1 | 1/2011 | Lassila et al. | |
| 2011/0264819 A1* | 10/2011 | Srinivasan | H04L 12/6418 |
| | | | 709/231 |
| 2017/0085664 A1 | 3/2017 | Howland et al. | |
| 2017/0206081 A1* | 7/2017 | Abadi | G06F 8/72 |

OTHER PUBLICATIONS

"Just in Time Remoting of Objects and Services"; IP.com No. 000233762; IP.com Publication Date: Dec. 19, 2013; 2 Pages.

"Method and System for Streaming Binary Large Object (BLOB) Data"; IP.com No. 000201624; IP.com Publication Date: Nov. 16, 2010; 2 Pages.

\* cited by examiner

FACILITATING COMMUNICATION BETWEEN AN ORIGIN MACHINE AND A TARGET MACHINE

CROSS-REFERENCE TO RELATED APPLICATIONS

This application is a continuation of U.S. application Ser. No. 14/921,366 filed Oct. 23, 2015 which is a continuation of U.S. application Ser. No. 14/856,804, filed on Sep. 17, 2015, the disclosure of which is incorporated by reference herein in its entirety.

BACKGROUND

The present disclosure relates generally to passing data streams between remote cooperating systems, and more specifically, to facilitating an efficient exchange of streaming data constructs between remote machines while making remote procedure calls.

In general, contemporary cooperating systems provide streaming of large binary objects using multiple processes and accounting for transmission errors. However, while contemporary cooperating systems provide the streaming of binary data, they fail to provide a form that an application programmable interface will take. That is, at present, contemporary cooperating systems are not clear as to how a streaming interaction between the two peers is established and managed.

SUMMARY

Embodiments include a method, system, and computer program product for facilitating communication between an origin machine and a target machine are provided. The embodiments include constructing within a remote object services level a reference to an original object of the origin machine; passing within the remote object services level the reference from the origin machine to the target machine; and in response to passing the reference, causing a creation of a proxy and an invocation of a target method on the target machine.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
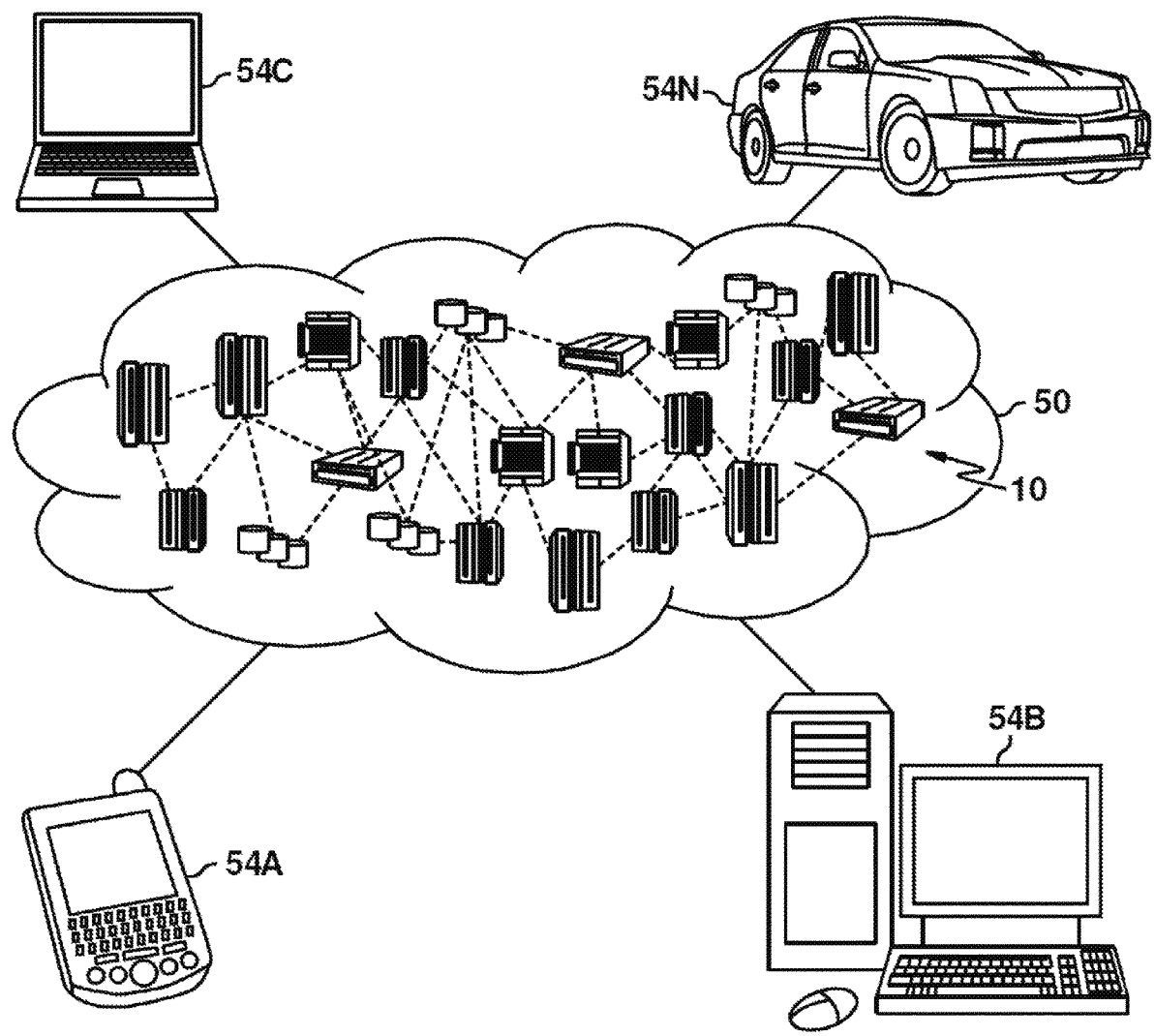
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
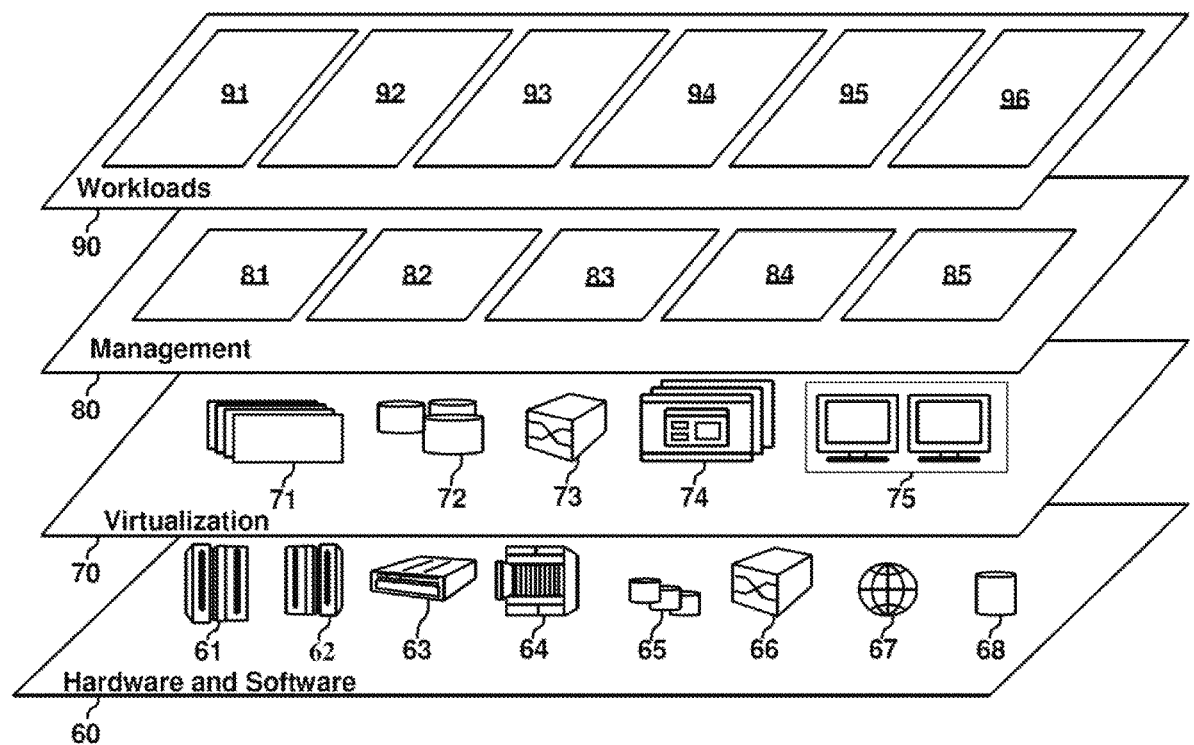
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

In view of the above, embodiments described herein relate to passing data streams between remote cooperating systems, and more specifically, to facilitating an efficient exchange of streaming data constructs between remote machines while making remote procedure calls.

In general, objects running on one system are provided with an ability to invoke methods against remote objects (e.g., objects which reside on another system) while passing, as an argument, an open stream (or streams) of data as part of this invocation. In turn, the remotely invoked method is also provided with an ability to return an open stream as its response. In this way, a seamlessly transfer control of a stream of data (while it's open and in use) from an origin system to a target system is created during a method invocation, along with a transfer of a stream of data from the target system back to the origin system when the invoked method returns a data stream.

It will be appreciated that the embodiments herein can be implemented by a hardware management console and support element that uses a layered approach to intra-system communications. In general, the hardware management console can provide an interface for configuring and operating virtualized systems, such that a system administrator is able to manage a software configuration and operation of partitions in a server system, as well as to monitor and identify hardware problems. The hardware management console communicates with each central processor complex (e.g. processor) of the virtualized system through the support element. When tasks are performed at the hardware management console, commands are sent to one or more support elements that then issue commands to their central processor complexes. Central processor complexes can be grouped at the hardware management console so that a single command can be passed along to as many as all of the central processor complexes defined to the hardware management console. For example, one hardware management console can control a plurality of support elements, while one support element can be controlled by a plurality of hardware management console.

With respect to the layered approach, a lowest layer involves code that uses sockets or other low level transports to flow data between the systems. A middle layer serves to multiplex conversations between the two nodes and takes steps to insulate upper layers from the connection itself (connection re-establishment logic). A top layer consists of a component called remote object services (ROS) or that manages a remote presence of objects on the systems or machines, e.g., in an ROS layer.

Generally, the ROS layer provides the ability to create a de facto reference to an object on a remote machine. Further, the ROS layer creates a local representation of this object (e.g., using Java proxy support) behind which general interaction are facilitated with an actual object residing on the remote machine. The ROS layer can also manage communication, error handling, implicit garbage collection of objects on the remote machine, etc., along with providing for a creation of implicit proxies.

With respect to implicit proxies, during the invocation of a method against an object being managed by ROS layer, arguments being passed to the method (if any) of a target system are typically serialized for transport during the method invocation. Likewise, the response being returned from the invocation is serialized for the return trip to the caller (origin system). This is adequate for many arguments and return values. However there is, on occasion, the need to allow the passing/returning of objects where their serialization is not practical or desirable due to a serialized size, a loss of sematic usefulness when serialized, and/or the object not being designed to be serialized.

For example, a serialized size makes communication of objects impractical when the object being returned, or passed, may reference a great number of other objects, and because serialization is actually applied to the web of object references, the actual serialized value may be excessively large.

Further, with respect to a loss of semantic usefulness when serialized, the use of the passed/returned object may require a reference to a 'live state' within the object on the origin system or machine. For example, if a passed object provides access to information which is constantly changing on the origin system, the act of serializing objects essentially makes a copy of these objects, which disassociates them from the origin system.

Also, as noted above, objects are not designed to be serialized. Correctly designing an object to be serialized requires that the object take into account future changes to ensure correct behavior as it evolves. This takes a conscious effort on the part of the developer (i.e., and can lead to unwanted maintenance).

In this way, the ROS allows objects to implement an interface called proxyable, which provides information to ROS on how the object should be modeled on the remote machine if the object is used as an argument or returned by a method invocation. In turn, an ROS framework can avoid serialization and, instead, create an implicit proxy on the foreign system. The ROS generated proxy (e.g., internally referred to as a remote reference) is then substituted as the appropriate argument or response allowing the recipients of these objects (target systems) to effectively call 'to the other machine' or origin system when the recipients use these implicit proxies during their course of operation.

As noted above, the ROS layer can also manage implicit garbage collection of objects on the remote machine. That is, because proxies can become extensively used as multiple remote method invocations take place (potentially to different remote systems), ROS takes steps to ensure that a remote reference is effectively unique (and reusable) on the source system. The local reference is kept from garbage collecting by a slow heart beat from any system or machine with an active remote reference. This extends the conceptual idea of a Java reference into the ROS layer which relies on activity instead of a typical is-the-object-anchored strategy to judge when it can be released for garbage collection. When all remote references are allowed to garbage collect (on the foreign machine(s)), their notification actions stop and, eventually, the real object on the local machine is released from ROS. This allows ROS to garbage collect on the local system, which enables users to continue to rely on the typical Java use/release model instead of requiring that they explicitly release a proxy reference. The local system need not know that the object it is interacting with is under ROS management. Note that other than ROS using the proxyable interface to determine the appropriate model, these actions take place without direct involvement of the users code.

In addition, ROS can address non-proxyable objects. Embodiments herein rely on the proxied objects implementing the proxyable interface to take advantage of the implicit proxy support. The ability to proxy objects whose classes are within the java virtual machine class library (e.g., for example java.io.InputStream and java.io.OutputStream) is complicated by the fact that two specific classes are not interfaces at all but are, instead, classes, which makes them ineligible for use with Java proxy support. ROS can address this by performing, for example, a streaming communication between an origin system and a target system in accordance with an embodiment.

Figure 3:
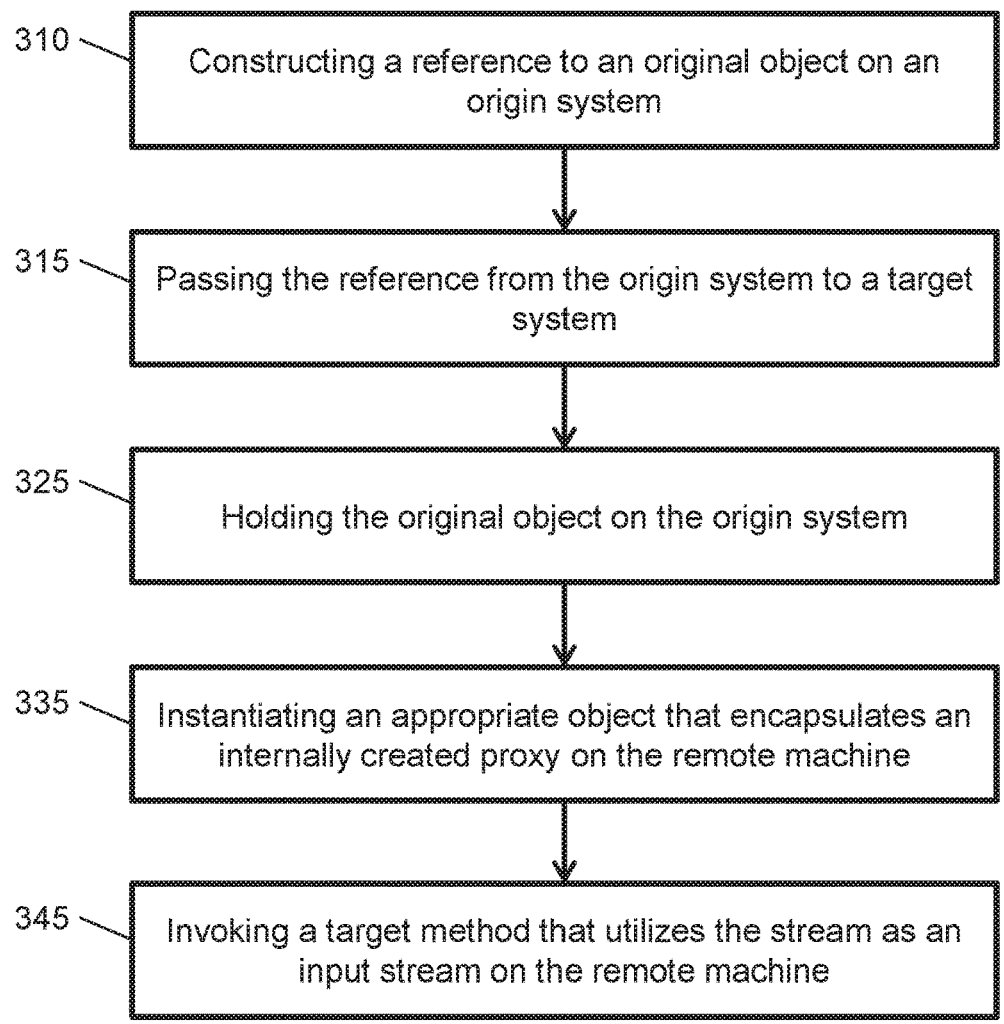
FIG. 3 depicts a process flow of a streaming communication by an origin system and a target system in accordance with an embodiment.
Figure 4:
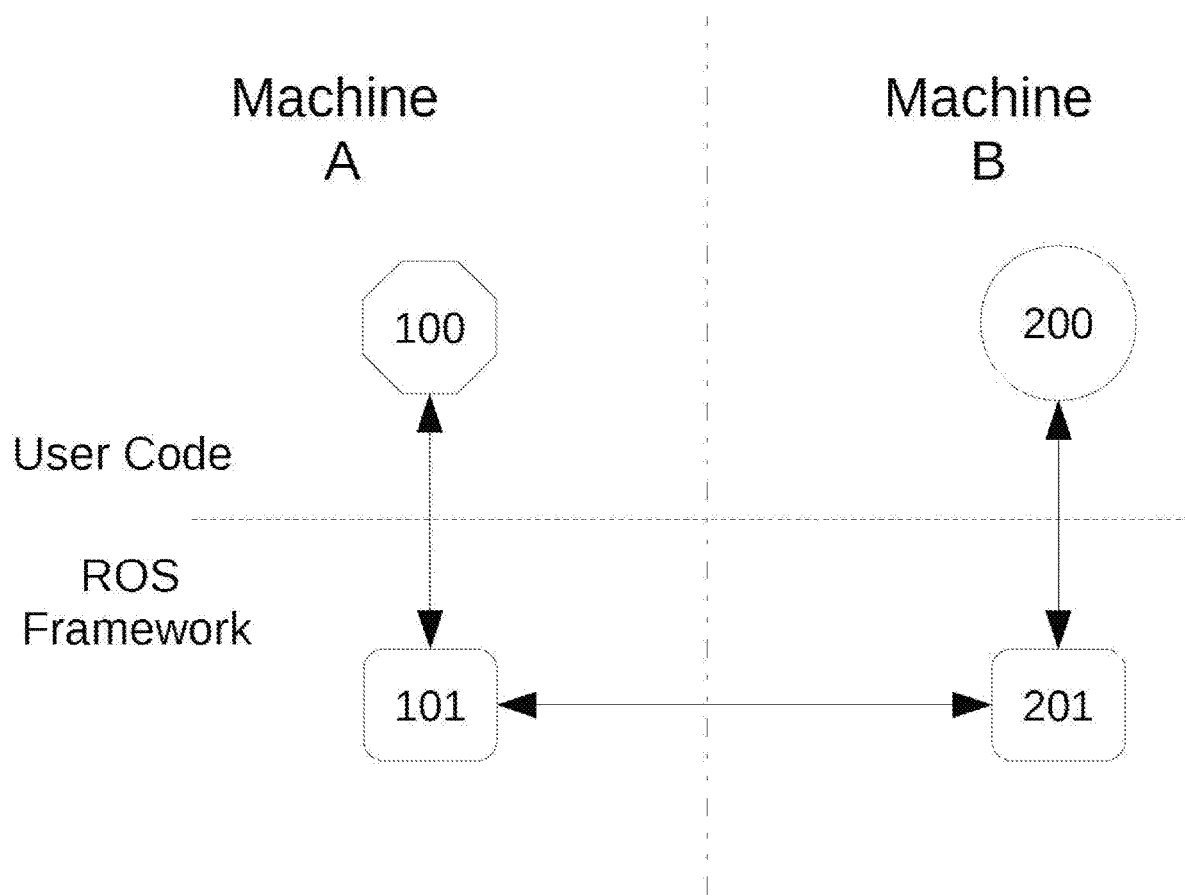
FIG. 4 depicts a schematic of a streaming communication between two systems in accordance with an embodiment

Turning now to FIG. 3, a process flow 300 of an example operation the streaming communication is depicted. The process flow 300 begins at block 310, where the origin system constructs a reference to an original object of the origin system. The reference is a constructed object, not the original object itself. The reference includes is a framework reference of the original object. Then, at block 315, the origin system passes the constructed reference to the target system. That is, on the origin system, when a method invocation involves the use of a stream, an implicit remote reference is created and passed along with the ROS invocation to the remote machine (target system). This will cause the creation of a proxy on the remote machine (target system).

Next, at block 325, the actual stream object is held by the ROS framework on the origin system. At block 335, the ROS framework on the remote machine instantiates in response to receiving the constructed reference an appropriate object that is used to encapsulate the internally created ROS proxy.

Then, at block 345, the target system invokes a target method that utilizes the stream as an input stream. Method invocations are directed to the enclosed proxy which, via the ROS framework, are passed to the actual target object on the originating system. In effect, the target method is unaware that it is reading from a stream of data from the original object of the origin system. That is, the object (appropriate object) is then given to the target of the invocation (i.e. the method), which is essentially unaware that the object they are interacting with is actually consuming data from (or writing to) a remote stream.

The process flow can be symmetrical when handling a method response involving a stream. In this case, the actual stream object stays on the target system and a proxy is created on the origin system. In one embodiment, a focus is on providing the ability to seamlessly share java.io.InputStream and java.io.OutputStream (any non-final object) with a remote system.

Turning now to FIGS. 4-7, schematics 400, 500, 600, 700 of a streaming communication between two systems are depicted in accordance with an embodiment. That is, the schematics 400, 500, 600, 700 of FIGS. 4-7 depict two machines, machine-A and machine-B, where a method invocation is initiated by code on machine-A targeting a method, myMethod( ), on machine-B. Note that each figure subsequent to FIG. 4 builds upon a prior FIG. so that an evolution of the streaming communication can be understood. Further, note that a pre-existing proxy/target relationship having been established prior to the method invocation is represented as follows: a hexagon represents a proxy, a circle represents the target of a proxy, and rounded-squares represent ROS elements used to manage these connections.

Beginning with schematic 400, the two machines that are cooperating, machine A and machine B, include user code area and ROS framework area. Items in the ROS framework are important for streaming communications, while not being directly accessed by user code (e.g., user code benefit from the existence of the ROS framework). A proxy object 100 is conceptually bound, via ROS, to object 200 on the remote machine. ROS components 101 and 201 facilitate the proxy/object relationship. The relationships are shown with the bidirectional lines.

Figure 5:
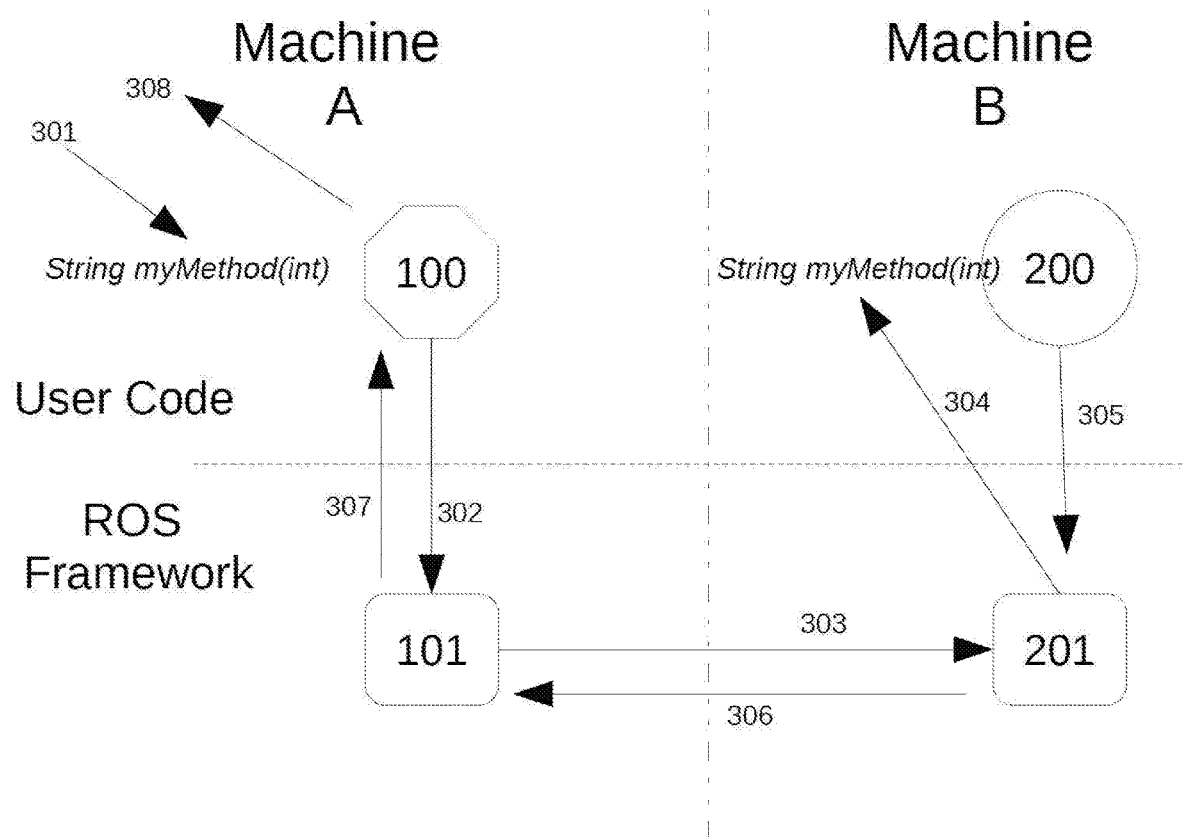
FIG. 5 depicts an evolution of the streaming communication between two systems of FIG. 4 in accordance with an embodiment.

Turning to FIG. 5, a method invocation takes place against a proxy object 100 with the schematic 500 illustrating this example using serialized arguments and return values. A user invokes a method 301 by passing an integer and expecting a response consisting of a string. In this example, both the integer and string are simple objects that serialize (e.g., do not exploit implicit proxies). A request 302 is communicated to the ROS component 101 on the machine-A (origin machine). A request 303 is communicated to the ROS component 201 on the machine-B (target machine). The request 303 contains a serialized form of the method argument (e.g., the serialized integer). Once arriving on the machine-B, the argument is de-serialized and presented to the target object 200 by a method invocation 304. The target object 200 processes the request and creates a string that will be returned 305 to the ROS component 201 responsible for handling the request 303. The response 306, which contains the serialized string, is communicated back to the ROS component 101 on the machine-A. Once the response 306 arrives on the machine-A, the response 306 is handed back 307 through the proxy object 100 to the original caller 308, completing the transaction.

Figure 6:
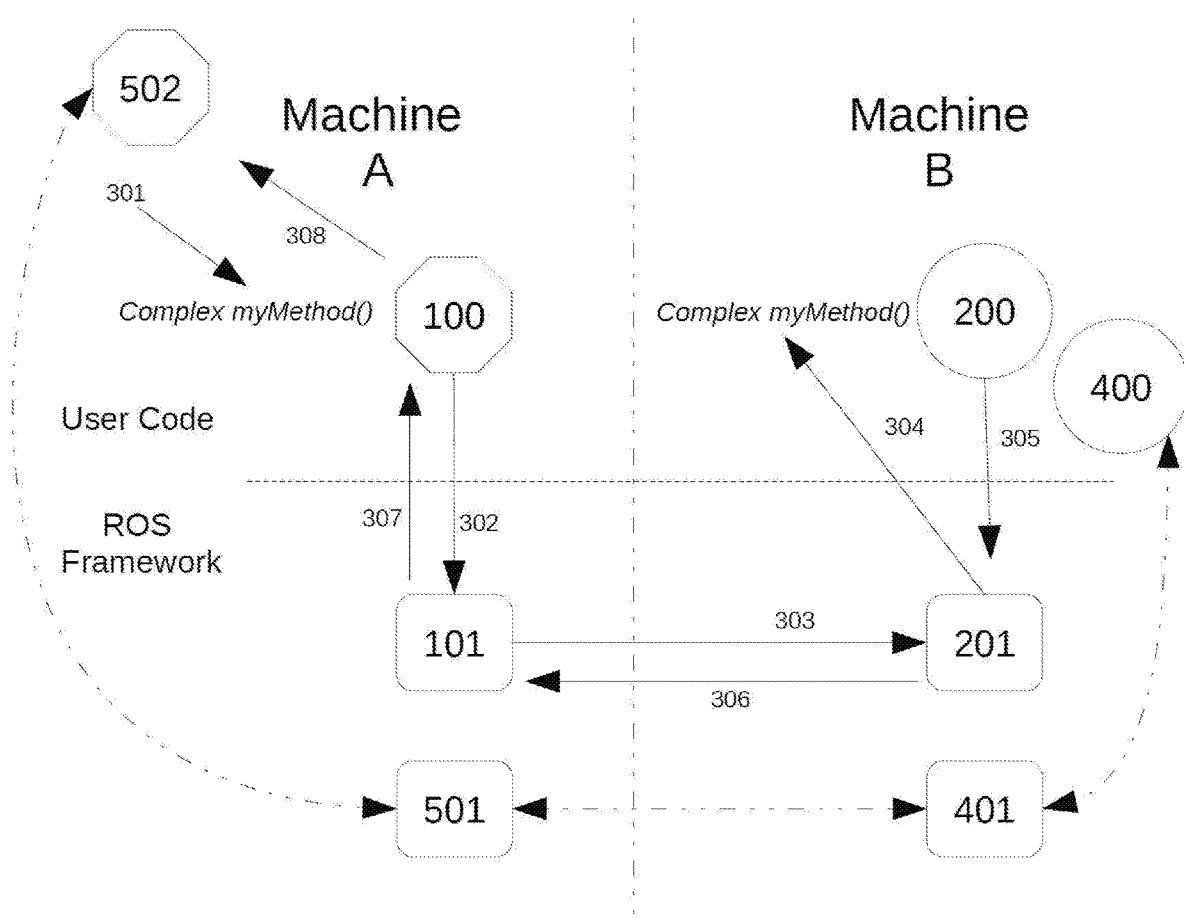
FIG. 6 depicts an evolution of the streaming communication between two systems of FIG. 5 in accordance with an embodiment.

FIG. 6, schematic 600 demonstrates an example creating of an implicit proxy. In FIG. 6, a user invokes a method 301 that accepts no arguments and is returning an object 400 (e.g., Complex object). The object 400 implements an interface (e.g., a Java interface, Complex), which exists on both machine-A and machine-B. The object 400 also implements the ROS interface (Proxyable). A request 302 is communicated to the ROS component 101 on the machine-A (origin machine). A request 303 is communicated to the ROS component 201 on the machine-B (target machine). In this example, there are no arguments being passed on the request 303. Once arriving at the ROS component 201 on the machine-B, the target object 200 is given the method invocation 304. The users target object 200 processes the method invocation 304 and creates an object 400 that will be returned 305 to the ROS component 201 responsible for handling the request. Because the object 400 implements the ROS interface (Proxyable), this indicates to the ROS framework that a new proxy pairing (e.g., 502, 501, 401, 400) should be established implicitly and a representation of this relationship should be communicated 306 to the ROS element 101 waiting on the machine-A instead of the actual object 400. In turn, this relationship is established and a proxy 502 is returned 307 to the original caller 308.

Figure 7:
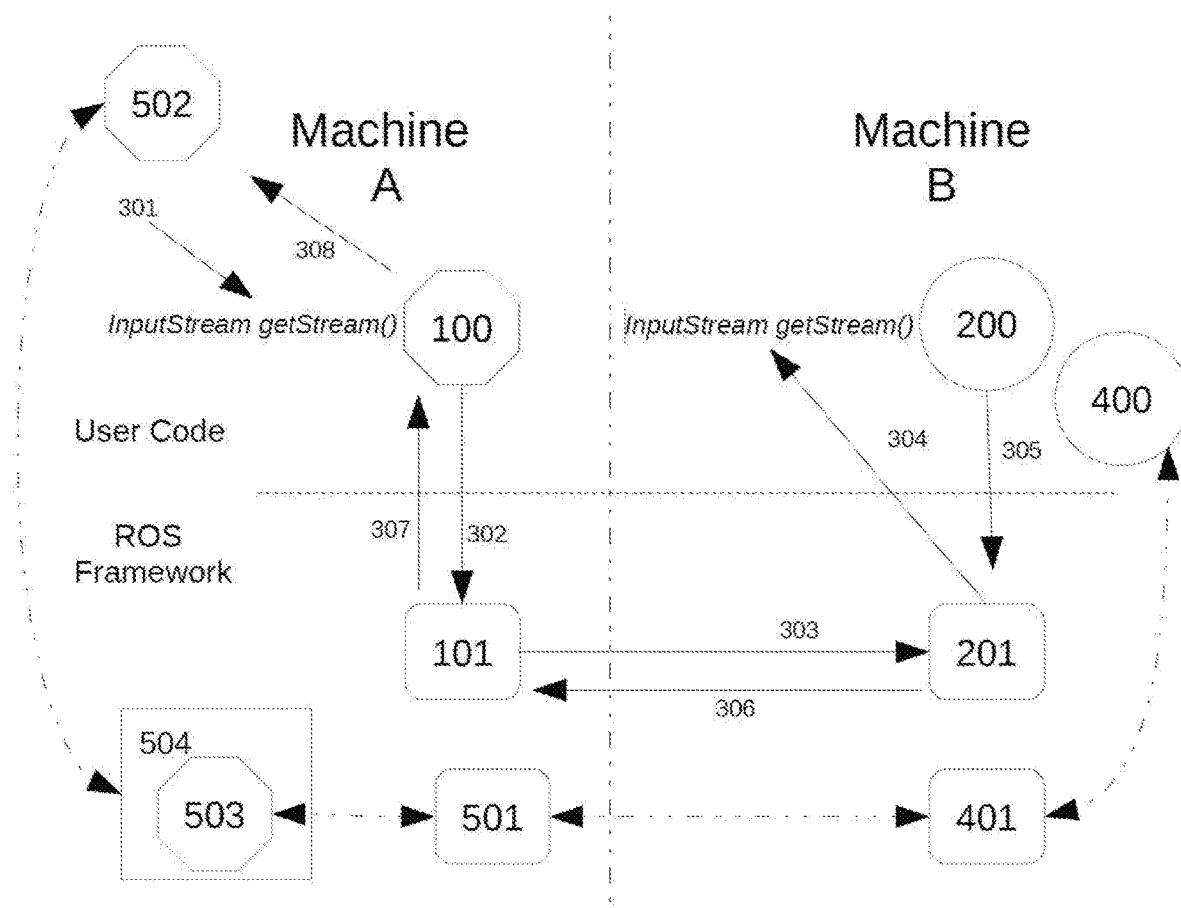
FIG. 7 depicts an evolution of the streaming communication between two systems of FIG. 6 in accordance with an embodiment.

Turning now to FIG. 7, schematic 700 demonstrates a return of a proxied stream. In FIG. 7, a method 301 is invoked that accepts no arguments and is returning an InputStream object. For example, this object can be a Java virtual machine class library object that cannot be changed (e.g., it can't be made Proxyable). This request 302 is communicated to the ROS component 101 on the machine-A (origin machine). A request 303 is communicated to the ROS component 201 on the machine-B (target machine). In this example, there are no arguments being passed on the request 303. Once arriving at the ROS component 201 on the machine-B, the target object 200 is given the method invocation 304. The target object 200) processes the request and creates an InputStream object 400 that will be returned 305 to the ROS component responsible 201 for handling the request.

Because the object cannot be serialized and is known to be an InputStream, this indicates to the ROS framework that a new proxy pairing (503,501,401,400) should be established implicitly and a representation of this relationship should be communicated 306 to the ROS element 101 waiting on the machine-A instead of sending the actual object 400.

Once arriving within the ROS components on the machine-A, an instance of an InputStream 504 is created on the machine-A which internally exploits a proxied connection 503 to the actual source of data on the machine-B (e.g., the actual object 400). A proxy 502 is created to the InputStream 504 instance and returned 307 to the original caller 308. When the user invokes a read( )method against the InputStream proxy 502, the proxy target 504, which is on the machine-A, obtains the data to return from an internal proxy 503 that accesses data from the remote proxy source of data (e.g., the actual object 400).

Note that while the schematic 700 illustrates the return of data, this same concept be exploited when passing a stream as an argument. When a stream is passed as an argument to a method invocation the 'local instance' (InputStream 504 in the schematic 700) would be established not on the origin system (machine-A) but would have been created on the target system (machine-B). The proxy to this local instance (InputStream proxy 502 in the schematic 700) would have been created on machine-B and passed to the method as an argument allowing the called method to consume data from a stream. In addition, while the above embodiments support for the passing/returning of Input and Output streams, other embodiments can be applied to any object that could be extended in such a way that it's internal function could be directed through a nested proxy object.

Technical effects and benefits of embodiments here include facilitating the exchange of large amounts of information (exploits streaming) when compared to building up large numbers of objects for an argument list; eliminating a need for developers to worry about establishing private sockets and other out of band communication techniques for moving large amounts of data during a method invocation; and allowing these targeted objects to work locally or remotely (target objects/systems do not care where the data is coming from, as the target objects/systems are just consuming data from the stream); and ensuring that a data flow is managed and controlled by the underlying framework (e.g., logging, compression, throttling, etc.). Thus, embodiments described herein are necessarily rooted in configurable computing resources to perform proactive operations to overcome problems specifically arising in the realm of passing data streams between remote cooperating systems (e.g., these problems include the when serialization of objects is not practical or desirable due to a serialized size, a loss of sematic usefulness when serialized, and/or the object not being designed to be serialized, resulting in unwanted processing costs and expenses).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for facilitating communication between an origin system and a target system comprising:
   constructing, by a processor disposed on the origin system, within a remote object services level a reference to an original object of the origin system;
   passing within the remote object services level the reference, along with a remote object services invocation, from the origin system to the target system, the reference comprising an implicit remote object services framework reference of the original object; and
   in response to passing the reference, causing an invocation of a target method on the target system that enables a receipt of a proxy by the origin system from the target system,
   wherein the target method is not configured to accept arguments.

2. The computer implemented method of claim 1, wherein a remote object services framework on the target system instantiates a target object encapsulating an internally created remote object services proxy in response to receiving the reference.

3. The computer implemented method of claim 1, wherein the original object is stored by the remote object services framework on the origin system.

4. The computer implemented method of claim 1, wherein the original object is a data stream.

5. The computer implemented method of claim 1, wherein the original object is not capable of being serialized.

6. A computer program product, the computer program product comprising a computer readable storage medium having program instructions facilitating communication between an origin system and a target system embodied therewith, the program instructions executable by a processor to cause the processor to perform:
   constructing within a remote object services level a reference to an original object of the origin system;
   passing within the remote object services level the reference, along with a remote object services invocation, from the origin system to the target system, the reference comprising an implicit remote object services framework reference of the original object; and
   in response to passing the reference, causing an invocation of a target method on the target system that enables a receipt of a proxy by the origin system from the target system,
   wherein the target method is not configured to accept arguments.

7. The computer program product of claim 6, wherein a remote object services framework on the target system instantiates a target object encapsulating an internally created remote object services proxy in response to receiving the reference.

8. The computer program product of claim 6, wherein the original object is stored by the remote object services framework on the origin system.

9. The computer program product of claim 6, wherein the original object is a data stream.

10. The computer program product of claim 6, wherein the original object is not capable of be serialized.

11. A system comprising:
    a memory having computer readable instructions; and
    a processor for executing the computer readable instructions for facilitating communication between an origin machine and a target machine, the computer readable instructions including:
    constructing within a remote object services level a reference to an original object of the origin machine;
    passing within the remote object services level the reference, along with a remote object services invocation, from the origin system to the target system, the reference comprising an implicit remote object services framework reference of the original object; and
    in response to passing the reference, causing an invocation of a target method on the target system that enables a receipt of a proxy by the origin system from the target system,
    wherein the target method is not configured to accept arguments.

12. The system of claim 11, wherein a remote object services framework on the target system instantiates a target object encapsulating an internally created remote object services proxy in response to receiving the reference.

13. The system of claim 11, wherein the original object is stored by the remote object services framework on the origin system.

14. The system of claim 11, wherein the original object is a data stream.

15. The system of claim 11, wherein the original object is not capable of be serialized.

* * * * *